United States Patent
Liu

(10) Patent No.: US 10,466,779 B1
(45) Date of Patent: *Nov. 5, 2019

(54) EVENT CAMERA FOR EYE TRACKING

(71) Applicant: Facebook Technologies, LLC, Menlo Park, CA (US)

(72) Inventor: Xinqiao Liu, Medina, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 15/658,117

(22) Filed: Jul. 24, 2017

(51) Int. Cl.
*G06F 3/01* (2006.01)
*G06T 19/00* (2011.01)
*H04N 5/225* (2006.01)

(52) U.S. Cl.
CPC .......... *G06F 3/013* (2013.01); *G06T 19/006* (2013.01); *H04N 5/2256* (2013.01)

(58) Field of Classification Search
CPC ..... G06F 3/013; G06T 19/006; H04N 5/2256; H04N 5/23245; H04N 5/335; H04N 5/351; H04N 5/353; H04N 5/2353
See application file for complete search history.

(56) References Cited

U.S. PATENT DOCUMENTS

| | | | | |
|---|---|---|---|---|
| 2007/0013652 A1* | 1/2007 | Kim | ........................ | A61B 3/113 345/156 |
| 2014/0363049 A1* | 12/2014 | Benosman | .............. | G06T 7/269 382/103 |
| 2016/0094796 A1* | 3/2016 | Govil | ................... | H04N 5/3456 348/295 |
| 2016/0094814 A1* | 3/2016 | Gousev | ................ | G06K 9/6267 348/143 |
| 2017/0236466 A1* | 8/2017 | Spitzer | ................. | G09G 3/2085 345/560 |
| 2018/0302562 A1* | 10/2018 | Newcombe | ........ | H04N 5/23245 |

OTHER PUBLICATIONS

Jurgen Kogler, Event Based Stereo Matching Approches for Frameless Adress Event Stereo Data, Sep. 26, 2011, pp. 676-680 (Year: 2011).*
Barua Souptik, Direct Face Detection and Video Reconstruction from Event Cameras, Mar. 7, 2016, pp. 1-5. (Year: 2016).*
Lichtsteiner, P. et al., "A 128×128 120 dB 15 µs Latency Asynchronous Temporal Contrast Vision Sensor," IEEE Journal of Solid-State Circuits, Feb. 2008, pp. 566-576, vol. 43, No. 2.

* cited by examiner

*Primary Examiner* — Hunter B Lonsberry
(74) *Attorney, Agent, or Firm* — Kilpatrick Townsend & Stockton LLP

(57) ABSTRACT

An eye tracking system includes an event camera. The event camera includes an event sensor and a controller. The event sensor includes a plurality of photodiodes that asynchronously output data values corresponding to relative intensity changes of light reflected from a user's eyes. The controller populates an event matrix based in part on data values asynchronously received from the event sensor and positions of photodiodes associated with the received data values over a first time period. The controller populates a change matrix based in part on a threshold intensity value and the photodiodes associated with the received data values over the first time period, and generates an image of the user's eyes for the first time period using the event matrix and the change matrix. The eye tracking system uses the image of the user's eyes to determine eye tracking information indicating positions, orientations and/or movement of the user's eyes.

20 Claims, 7 Drawing Sheets

EVENT CAMERA FOR EYE TRACKING

BACKGROUND

The present disclosure generally relates to eye tracking systems, and specifically relates to eye tracking using event cameras.

Traditional eye tracking systems use a camera and a separate light source. These conventional eye tracking systems track, e.g., orientation of a user's eyes by, e.g., analyzing reflections of the light source in images captured by the camera. Alternatively, traditional eye tracking systems may use a structured light source and determine a 3D model of the user's eye by analyzing, e.g., distortion of the structured light in the captured images.

SUMMARY

An eye tracking system tracks one or more eyes of a user in a local area. The eye tracking system includes an event camera and an eye tracking module. The event camera captures one or more images of an eye of the user. The eye tracking module determines eye tracking information (e.g., gaze direction) using the captured one or more images.

The event camera is an imaging device that includes an event sensor and a controller. The event sensor includes a plurality of photodiodes and is configured to operate in one or modes including an event mode. An event sensor operating in the event mode asynchronously outputs data values corresponding to relative intensity changes of light reflected from the one or more eyes of the user. A data value output by each respective photodiode, of the plurality photodiodes, is based at least in part on a difference of a value previously output by the photodiode and an intensity value captured by the photodiode relative to an intensity threshold value. The event camera controller populates an event matrix based in part on data values asynchronously received from the event sensor and positions of photodiodes associated with the received data values over a first time period. The event camera controller populates a change matrix based in part on the threshold intensity value and the photodiodes associated with the received data values over the first time period, and generates an image of the one or more eyes of the user for the first time period using the event matrix and the change matrix. In event mode of operation there is no image "frame." Accordingly the event sensor is able to output data at a much faster rate than, e.g., a traditional imaging sensor which reads out, in a synchronous manner, a bit value for every photodiode in its sensor in the form of an image frame.

In some embodiments, the imaging device can also operate in a conventional mode and generate conventional image frames. The imaging device may use the conventional image frames to facilitate generation of images of the one or more eyes of the user using image data generated in the event mode.

Additionally in some embodiments, the eye tracking system may also include a light source to provide an illumination (e.g., IR light) of the eye of the user. Note, that unlike conventional eye tracking systems, the eye tracking module does not use a location the illumination source relative to the event camera to determine the depth information. Instead, the illumination source simply is used to e.g., increase signal-to-noise ratio of the light captured by the event camera. The eye tracking system and associated event camera may be part of, e.g., a head-mounted display (HMD), a cellphone, a machine vision system, a depth camera assembly, etc. In some embodiments, the eye tracking system and associated event camera may be part of a HMD in a virtual reality (VR) system, an augmented reality (AR) system, a mixed reality (MR) system, or some combination thereof.

BRIEF DESCRIPTION OF THE DRAWINGS

FIG. 4 is an example of an image equation that is populated over a first time period, according to an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
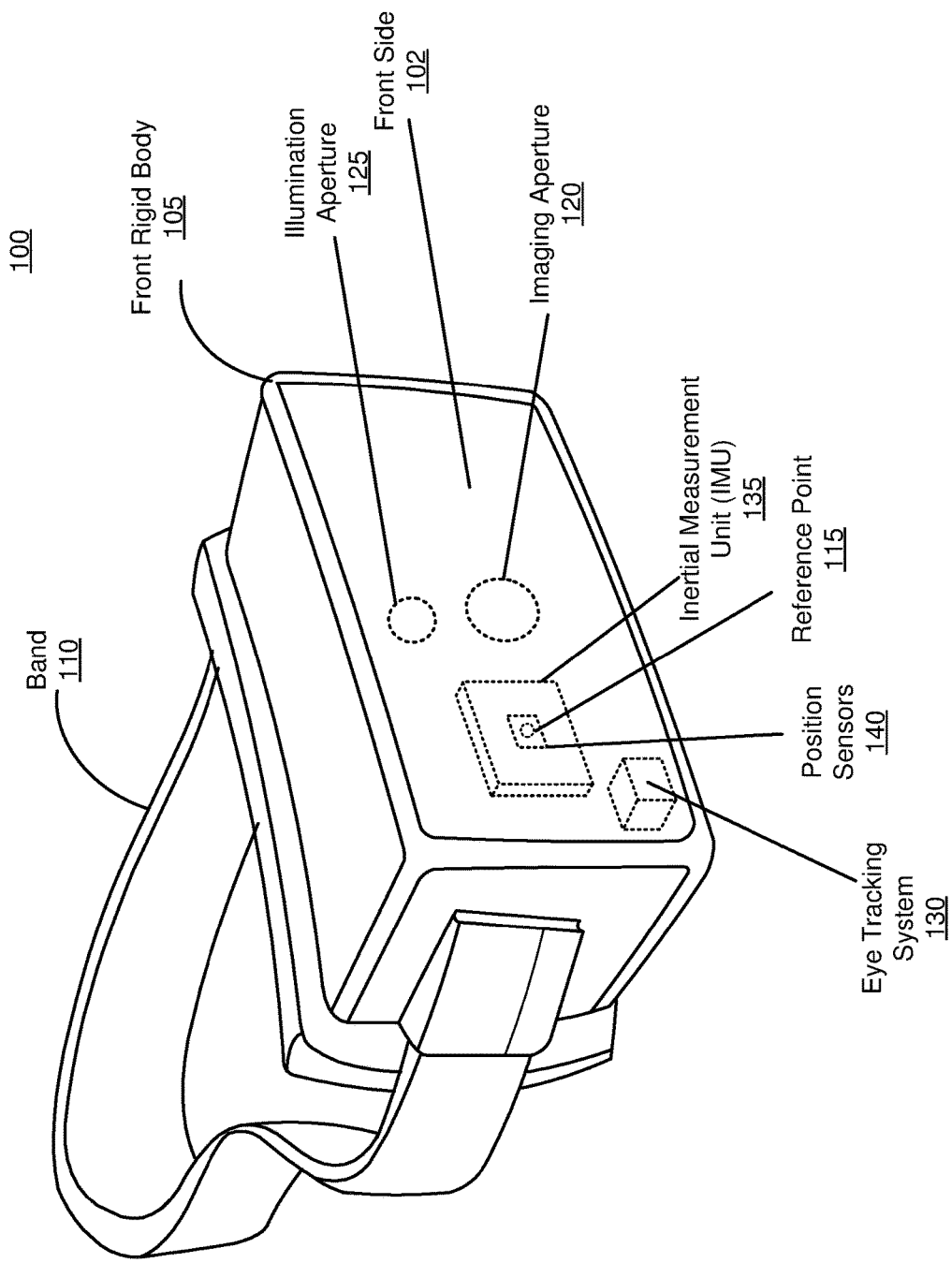
FIG. 1 is a wire diagram of a HMD, in accordance with an embodiment.

FIG. 1 is a diagram of a HMD 100, in accordance with an embodiment. The HMD 100 may be part of, e.g., a VR system, an AR system, a MR system, or some combination thereof. In embodiments that describe AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). The HMD 100 includes a front rigid body 105, a band 110, and a reference point 115. In some embodiments, the HMD 100 shown in FIG. 1 also includes a depth camera assembly (DCA) configured to determine depth information of a local area surrounding some or all of the HMD 100. In these embodiments, the HMD 100 would also include an imaging aperture 120 and an illumination aperture 125, and an illumination source of the DCA would emit light (e.g., structured light) through the illumination aperture 125. And an imaging device of the DCA would capture light from the illumination source that is reflected/scattered from the local area through the imaging aperture 120.

In one embodiment, the front rigid body 105 includes one or more electronic display elements (not shown in FIG. 1), one or more integrated eye tracking systems 130 (e.g., one eye tracking system 130 for each eye of a user wearing the HMD 100), an Inertial Measurement Unit (IMU) 135, one or more position sensors 140, and the reference point 115. In the embodiment shown by FIG. 1, the position sensors 140 are located within the IMU 135, and neither the IMU 135 nor the position sensors 140 are visible to a user of the HMD 100. The IMU 135 is an electronic device that generates fast calibration data based on measurement signals received from one or more of the position sensors 140. A position sensor 140 generates one or more measurement signals in response to motion of the HMD 100. Examples of position sensors 140 include: one or more accelerometers, one or more gyroscopes, one or more magnetometers, another suitable type of sensor that detects motion, a type of sensor used for error correction of the IMU 135, or some combination thereof. The position sensors 140 may be located external to the IMU 135, internal to the IMU 135, or some combination thereof.

The eye tracking system 130 estimates a position and angular orientation of an eye of a user wearing the HMD 100. The position and angular orientation of the eye corresponds to the direction of the user's gaze within the HMD 100. The orientation of the user's eye is defined herein as the direction of the foveal axis, which is the axis between the fovea (an area on the retina of the eye with the highest concentration of photoreceptors) and the center of the eye's pupil. In general, when user's eyes are fixed on a point, the foveal axes of the user's eyes intersect that point. The pupillary axis is another axis of the eye which is defined as the axis passing through the center of the pupil which is perpendicular to the corneal surface. The pupillary axis does not, in general, directly align with the foveal axis. Both axes intersect at the center of the pupil, but the orientation of the foveal axis is offset from the pupillary axis by approximately −1° to 8° laterally and ±4° vertically. Because the foveal axis is defined according to the fovea, which is located in the back of the eye, the foveal axis can be difficult or impossible to detect directly in some eye tracking embodiments. Accordingly, in some embodiments, the orientation of the pupillary axis is detected and the foveal axis is estimated based on the detected pupillary axis.

In general, movement of an eye corresponds not only to an angular rotation of the eye, but also to a translation of the eye, a change in the torsion of the eye, and/or a change in shape of the eye. The eye tracking system 130 may also detect translation of the eye: i.e., a change in the position of the eye relative to the eye socket. In some embodiments, the translation of the eye is not detected directly, but is approximated based on a mapping from a detected angular orientation. Translation of the eye corresponding to a change in the eye's position relative to the detection components of the eye tracking system 130 may also be detected. Translation of this type may occur, for example, due to shift in the position of the HMD 100 on a user's head. The eye tracking system 130 may also detect the torsion of the eye, i.e., rotation of the eye about the pupillary axis. The eye tracking system 130 may use the detected torsion of the eye to estimate the orientation of the foveal axis from the pupillary axis. The eye tracking system 130 may also track a change in the shape of the eye, which may be approximated as a skew or scaling linear transform or a twisting distortion (e.g., due to torsional deformation). The eye tracking system 130 may estimate the foveal axis based on some combination of the angular orientation of the pupillary axis, the translation of the eye, the torsion of the eye, and the current shape of the eye.

The eye tracking system 130 provides for means to relate an exterior three-dimensional surface of cornea and sclera in the eye to its gaze position, in addition to an optical power through the front corneal surface and interaction with the pupil surface. The sclera is the relatively opaque (usually visibly white) outer portion of the eye, which is often referred to as the "white of the eye." The cornea is the curved surface covering the iris and the pupil of the eye. The eye tracking system 130 allows for a path to measure eye surfaces/features off-axis (from the direct pupil gaze) through time-of-flight depth sensing methods. This is achieved herein by an implementation of the eye tracking system 130 that includes an event camera set at a defined angle to an eye-box, i.e., an imaged region of interest that includes an eye of the user. The event camera is described in detail below with regard to FIGS. 2-4. As discussed below, the eye tracking system 130 updates a model of the eye using depth information derived from the images output by the event camera. The eye tracking system 130 can also estimate the pupillary axis, the translation of the eye, the torsion of the eye, and the current shape of the eye based on the depth information derived from time-of-flight phase retrieval methods.

As the orientation may be determined for both eyes of the user, the eye tracking system 130 is able to determine where the user is looking. The HMD 100 can use the orientation of the eye to, e.g., determine an inter-pupillary distance (IPD) of the user, determine gaze direction, introduce depth cues (e.g., blur image outside of the user's main line of sight), collect heuristics on the user interaction in the VR/AR/MR media (e.g., time spent on any particular subject, object, or frame as a function of exposed stimuli), some other function that is based in part on the orientation of at least one of the user's eyes, or some combination thereof. Determining a direction of a user's gaze may include determining a point of convergence based on the determined orientations of the user's left and right eyes. A point of convergence may be the point that the two foveal axes of the user's eyes intersect (or the nearest point between the two axes). The direction of the user's gaze may be the direction of a line through the point of convergence and though the point halfway between the pupils of the user's eyes.

Additionally, in some embodiments, the eye tracking system 130 may also include one or more illumination sources. The illumination sources would illuminate the eye with light. The function of the illumination source would be, e.g., to increase a signal-to-noise ratio in the data captured by the event camera in the event that light from an internal display is not sufficient. The location of the one or more illumination sources relative to the event camera is not relevant in actually determining depth information. In contrast, conventional eye tracking methodologies the relative location is important as eye orientation can be determined from a reflections of the illumination sources.

Figure 2:
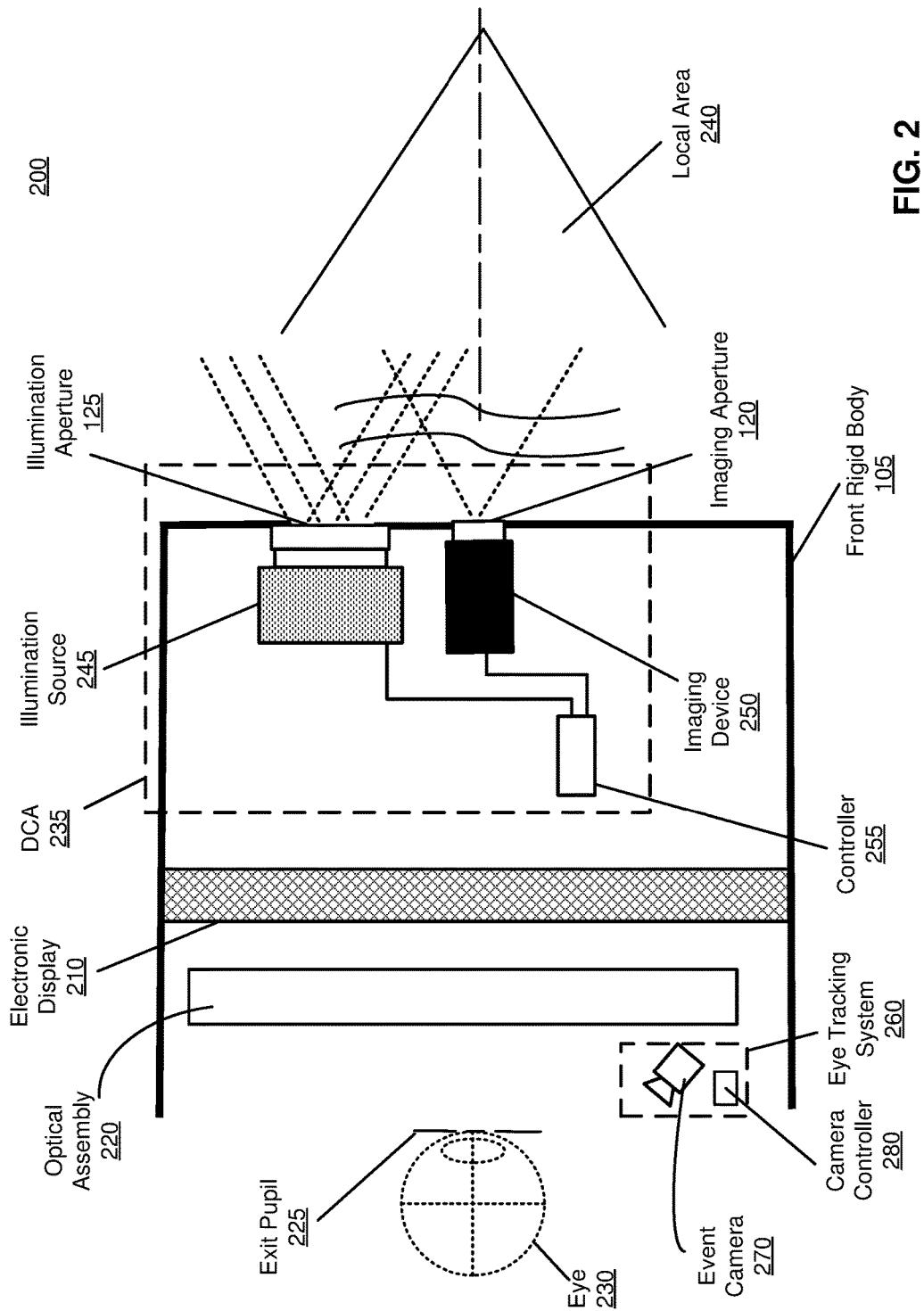
FIG. 2 is a cross section of a front rigid body of the HMD in FIG. 1, in accordance with an embodiment.

FIG. 2 is a cross section 200 of the front rigid body 105 of the embodiment of the HMD 100 shown in FIG. 1. As shown in FIG. 2, the front rigid body 105 includes an electronic display 210 and an optical assembly 220 that together provide image light to an exit pupil 225. The exit pupil 225 is the location of the front rigid body 105 where a user's eye 230 is positioned. For purposes of illustration, FIG. 2 shows a cross section 200 associated with a single eye 230, but another optical assembly 220, separate from the optical assembly 220, provides altered image light to another eye of the user.

The electronic display 210 generates image light. In some embodiments, the electronic display 210 includes an optical element that adjusts the focus of the generated image light. The electronic display 210 displays images to the user in accordance with data received from a console (not shown in FIG. 2). In various embodiments, the electronic display 210 may comprise a single electronic display or multiple electronic displays (e.g., a display for each eye of a user). Examples of the electronic display 210 include: a liquid crystal display (LCD), an organic light emitting diode (OLED) display, an inorganic light emitting diode (ILED)

display, an active-matrix organic light-emitting diode (AMOLED) display, a transparent organic light emitting diode (TOLED) display, some other display, a projector, or some combination thereof. The electronic display 210 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the display block optical elements may have one or more coatings, such as anti-reflective coatings.

The optical assembly 220 magnifies received light from the electronic display 210, corrects optical aberrations associated with the image light, and the corrected image light is presented to a user of the HMD 100. At least one optical element of the optical assembly 220 may be an aperture, a Fresnel lens, a refractive lens, a reflective surface, a diffractive element, a waveguide, a filter, a reflective surface, a polarizing reflective surface, or any other suitable optical element that affects the image light emitted from the electronic display 210. Moreover, the optical assembly 220 may include combinations of different optical elements. In some embodiments, one or more of the optical elements in the optical assembly 220 may have one or more coatings, such as anti-reflective coatings, dichroic coatings, etc. Magnification of the image light by the optical assembly 220 allows elements of the electronic display 210 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optical assembly 220 is designed so its effective focal length is larger than the spacing to the electronic display 210, which magnifies the image light projected by the electronic display 210. Additionally, in some embodiments, the amount of magnification may be adjusted by adding or removing optical elements.

The front rigid body 105 further includes a DCA 235 for determining depth information of one or more objects in a local area 240 surrounding some or all of the HMD 100. The DCA 235 includes an illumination source 245, an imaging device (camera) 250, and a controller 255 that may be coupled to both the illumination source 245 and the imaging device 250. The illumination source 245 emits light (e.g., structured light) through the illumination aperture 125. The illumination source 245 may be composed of a plurality of laser-type light emitters on a single substrate configured to simultaneously or in different time instants (e.g., controlled by the controller 260) emit a plurality of light beams, e.g., in the form of a structured light pattern. The imaging device 250 captures light from the illumination source 245 that is reflected/scattered from the local area 240 through the imaging aperture 120. The controller 260 may be configured to determine depth information of the one or more objects in the local area 240 based on the captured reflected/scattered light.

As shown in FIG. 2, the front rigid body 105 further includes an eye tracking system 260 placed between the user's eye 230 and the optical assembly 220 configured to determine and track a position and orientation of the user's eye 230. The eye tracking system 260 is an embodiment of the eye tracking system 130 in FIG. 1. In alternate embodiments, the eye tracking system 260 is placed between the optical assembly 220 and the electronic display 210 or within the optical assembly 220. The eye tracking system 260 includes an event camera 270 and a camera controller 280. The event camera 270 is described in detail below with regard to FIGS. 3 and 4.

The event camera 270 captures light reflected from the portion of the eye 230 illuminated by light from the electronic display 210. In some embodiments, the eye tracking system 260 may also include one or more illumination sources (not shown) that illuminate the eye. The one or more illumination sources emit light to increase the signal-to-noise ratio in the data captured by the event camera 270. The one or more illumination sources emit light that the event camera 270 is in a detection band of the event camera 270. For example, the one or more illumination sources may emit in visible light, infrared light, some other band of light that is in the detection band of the event camera 270, or some combination thereof.

A camera controller 280 coupled to the event camera 270 (and coupled to the optional one or more illumination sources) or integrated into the event camera 270 may be configured to determine eye tracking information for the user's eye 230. The determined eye tracking information may comprise information about a position and orientation of the user's eye 230 in an eye-box, i.e., information about an angle of an eye-gaze. The components of the eye tracking system 260 are positioned outside an optical axis of the front rigid body 105, i.e., the event camera 270 are positioned outside of a direct optical path and a non-primary reflected optical path of the user's eye 230 to the electronic display 210.

Based on the determined and tracked position and orientation of the user's eye 230 (i.e., eye-gaze), the HMD 100 may adjust presentation of an image displayed on the electronic display 210. In some embodiments, the HMD 100 may adjust resolution of the displayed image based on the eye tracking information. A maximum pixel density for displaying an image on the electronic display 210 can be provided in a foveal region of the determined eye-gaze, whereas a lower resolution display is employed in other regions, without negatively affecting the user's visual experience. More details about implementation and operation of the eye tracking system 260 are further described below in conjunction with FIGS. 3-7.

Figure 3:
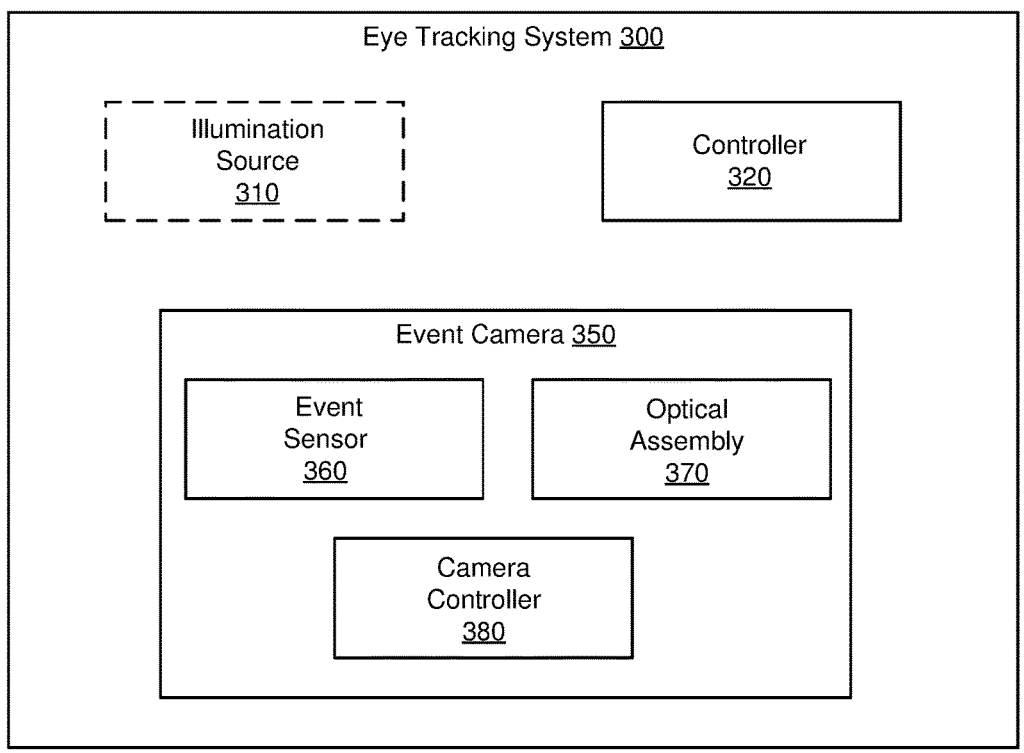
FIG. 3 is a high-level block diagram illustrating a detailed view of an eye tracking system, in accordance with an embodiment.

FIG. 3 is a high-level block diagram of an eye tracking system 300 in accordance with one embodiment. The embodiment of the eye tracking system 300 illustrated in FIG. 3 is composed of a controller 320 and an event camera 350. In some embodiments, the eye tracking system 300 may also include an illumination source 310. Some embodiments of the eye tracking system 300 have different modules or components than those described in conjunction with FIG. 3. Similarly, the functions further described below may be distributed among components of the eye tracking system 300 in a different manner than described in conjunction with FIG. 3.

The illumination source 310 illuminates one or both eyes of the user with light. The illumination source 310 includes one or more light sources. The light sources may be, e.g., a photodiode, a LED, or some other light source. A light source may emit light in the visible band (i.e., ~380 nm to 750 nm), in the infrared (IR) band (i.e., ~750 nm to 1 mm), in the ultraviolet band (i.e., 10 nm to 380 nm), some other portion of the electromagnetic spectrum in a band of the event camera 350, or some combination thereof.

The event camera 350 is a camera that captures image information corresponding to relative intensity changes within a local area. In the embodiment shown in FIG. 3, the event camera 350 is a part of a HMD and is used to capture images of one or more eyes of a user of the HMD. These images are then used by the controller 320 to obtain eye tracking information.

The event camera 350 is composed of an event sensor 360, an optical assembly 370, and a camera controller 380. Some embodiments of the event camera 350 have different modules or components than those described in conjunction with FIG. 3. Similarly, the functions further described below may be distributed among components of the event camera 350 in a different manner than described in conjunction with FIG. 3.

The event sensor 360 includes a plurality of photodiodes used to capture images of one or more eyes of a HMD user in accordance with imaging instructions. Imaging instructions are instructions that cause the event sensor 360 to capture one or more images. Imaging instructions may include, e.g., mode type (i.e., event mode or conventional mode), frame rate, number of frames, shutter speed, some other factor that affects image capture, photodiode threshold value, event frame period, or some combination thereof. The captured images may be, e.g., one or more event frames, one or more image frames, or some combination thereof.

In an event mode, each of the plurality of photodiodes of the event sensor 360 independently and in continuous time quantizes local relative intensity changes in a local area. A relative intensity change is measured against a prior intensity value (i.e., the previous intensity value of the photodiode). In an event mode of operation, for each photodiode, if a change in intensity over a particular time period is more than a threshold value, the photodiode outputs a specific photodiode data value (i.e., a photodiode address event (AE) occurs). If the change in intensity is less than the threshold value over the event frame period, no data value is output for that photodiode. Accordingly, an AE may not occur for each photodiode. Note that because each photodiode generates a data value based on whether or not a change in intensity over a particular time period compared to its previous intensity value is more than a threshold value, photodiode AEs are asynchronously output from the event sensor 360. Note that in this mode of operation there is no image "frame." Thus, the event camera 350 is able to output data at a much faster rate than, e.g., a traditional imaging sensor which reads out, in a synchronous manner, a bit value for every photodiode in its sensor in the form of an image frame.

In the event mode, the event sensor 360 gathers generated data values for a specific period of time, and uses the gathered data values to generate an event frame. The specific period of time may be, e.g., 160 ms, or some other value. In some embodiments, this period of time may be adjustable by a user of the event camera 120 and/or may be determined by e.g., the camera controller 380.

In some embodiments, the event sensor 360 may be configured to also operate in a conventional mode. An event sensor 360 operating in a conventional mode functions as a traditional imaging sensor. For example, in a conventional mode of operation each photodiode of the event sensor 360 outputs a photodiode value that is based on an amount of light collected over an integration period (e.g., how long a shutter is open). And an image frame is output that includes data from each of the photodiodes. In some embodiments, the event camera 350 may be configured to dynamically select a particular mode of operation, or may be instructed to switch to a particular mode of operation.

To further distinguish the event mode from the conventional mode, consider the following examples. An eye in a field of view of the event camera 350 may be moving relative to the event camera 350 causing associated changes in relative intensity values. Photodiodes in the event sensor would output data values if a relative change is over their associated threshold values (i.e., a photodiode AE occurs). In contrast, if the eye is static relative to the event camera 350, the event sensor would have very few photodiodes whose relative intensity values are above the threshold value. Accordingly, in the event mode, there is no "frame," instead there is an asynchronous stream of photodiode AEs. In this example, there would likely be a large number of photodiode AEs associated with the eye as relative intensity changes would likely occur due to movement. In contrast, a much smaller number (and potentially no) photodiode AEs associated with a static eye would occur as there would be minimal change in relative intensity values. But, in conventional mode, each photodiode of the event sensor outputs a photodiode value that is based on an amount of light collected over an integration period. Therefore, whether an object is static or dynamic has no effect on the size of the image frame. In some embodiments, the event camera 350 can interleave a series of event frames with one or more image frames to create, e.g., a low bandwidth video.

The optical assembly 370 directs light reflected from the eyes of a user to the event sensor 360. The optical assembly includes one or more optical elements. An optical element may be, e.g., a positive lens, a negative lens, a prism, a filter, a diffractive element, an aperture, or some combination thereof. In some embodiments, one or more of the optical elements may have one or more coatings (e.g., anti-reflection coating, IR coating, etc.). In some embodiments, the optimal assembly 370 may be able to dynamically adjust its focal length (e.g., zoon) and/or aperture.

The camera controller 380 controls the event sensor 360, and in some embodiments the optics assembly 370. The camera controller 380 generates imaging instructions and provides the imaging instructions to the event sensor 360 and/or the optics assembly 370. In some embodiments, the controller generates the imaging instructions based upon input from a user of the event camera 350 and/or a console. In other embodiments, the camera controller 380 may automatically generate the imaging instructions.

The camera controller 380 generates images using data from the event sensor 360. The controller generates an image based on solving an image equation:

$$Ax=y \qquad (1)$$

where A is an event matrix, x is an intensity matrix and y is a change matrix. The event matrix (A) is a N×n sparse matrix whose columns are representative of a specific photodiode and whose rows are representative of a specific time an AE occurred. N is the number of photodiodes in the event sensor, and n is a number of AEs that have occurred. The change matrix (y) is a 1×n vector of threshold intensity values. Each value of the change matrix is either $-\tau$ or $+\tau$, where $\tau$ is the data value output by the photodiode. The intensity matrix (x) is a 1×n vector, whose values describe intensity values of the photodiodes where an AE occurred.

As discussed in detail below with regard to FIG. 4, for a first time period, the camera controller 380 populates the event matrix based in part on data values asynchronously received from the event sensor 360 and positions of photodiodes associated with the received data values over a first time period. The camera controller 380 populates a change matrix based in part on the threshold intensity values of the photodiodes associated with the received data values over the first time period. The camera controller 380 then generates generate an image for the first time period using the event matrix and the change matrix. The camera controller 380 would then repeat the above process for subsequent time periods to generate subsequent images.

Turning now to the controller 320 of the eye tracking system 300, the controller 320 controls the event camera 350 and the illumination source 310 (if present). The controller 320 determines eye tracking information using image data generated by the event camera 350. In some embodiments, the controller 320 uses information received from the event camera 250 to update a model, M, of the eye. The controller 320 then determines eye tracking information based on the updated model. Eye tracking information is information describing a position and/or orientation of one or more eyes. Eye tracking information includes, e.g., position and orientation of one or both eyes if the user, gaze direction (e.g., where a user is looking), vergence, estimated accommodation plane, etc.

The model M maintained and updated by the controller 320 is a model which approximates the surface geometry of one or both eyes of the user. The model also includes a mapping of different orientations and/or positions of the eye to specific locations on, e.g., an electronic display (e.g., electronic display 210). In some embodiments, the model is generated by e.g., augmenting a default model with information obtained through a calibration procedure. For example, the default model may include multiple parameters (eye radius, pupil size, IPD, etc.) that can be adjusted during calibration. A calibration procedure could be, e.g., displaying a series of points and prompting the user to look at each of the points.

In some embodiments, M is a 3D model which approximates the surface geometry of the eye. The 3D model may have two orthogonal axes defined about which the model of the eye rotates. Thus, the 3D model may incorporate two angles, $\alpha$ (yaw) and $\beta$ (pitch), which specify the orientation of the eye relative to the centered orientation of the eye (i.e., $\alpha=\beta=0°$ corresponds to the eye looking straight ahead). $\alpha$ and $\beta$ may correspond to the angular direction of the foveal axis. M may also incorporate a roll angle, $\gamma$, which corresponds to the roll of the eye (i.e., the torsion). M may further incorporate a translation vector $[x_0, y_0, z_0]^T$, which specifies a translation of the 3D model in a Cartesian coordinate system. In some embodiments, the angle of the pupillary axis or ($\alpha$, $\beta$) is mapped to a translation vector, $[x_0, y_0, z_0]^T$. In embodiments in which detecting the orientation of the eye comprises detecting the pupil, M may incorporate a pupil diameter, d. In some embodiments, the foveal axis is calculated based on the angle of the pupillary axis, $[x_0, y_0, z_0]^T$, $\gamma$, and a parameter corresponding to the location of the fovea stored in M. In some embodiments, tracking the eye may constitute finding the values of $\alpha$ and $\beta$ which make the 3D model of the eye most closely fit the scanned portion of the eye. In some embodiments, tracking the eye comprises matching the scanned portion of the eye to M using some combination of $\alpha$ and $\beta$, the angle of the pupillary axis, $[x_0, y_0, z_0]^T$, $\gamma$, and d.

The model, M, may be a mathematical model of the 2D surface of the eye embedded in 3D space. M may be continuous, or may consist of discrete points. For example, in Cartesian space, the x, y, and z axes may correspond to the center axis of the eye, the horizontal axis orthogonal to the center axis of the eye, and the vertical axis, respectively. The model may include of a function, $X(y, z, \alpha, \beta)$ wherein every set of ($\alpha$, $\beta$) generates a surface protruding into the x axis from the y-z plane. In some embodiments, $\alpha$ and $\beta$ correspond to the angles of a rotational transform applied to the surface in. For example, if $(x,y,z)=(0,0,0)$ corresponds to the point of rotation of the model of the eye, then this rotation may be represented by the rotation matrix $R_z(\alpha)R_y(\beta)$, where $R_z(\alpha)$ and $R_y(\beta)$ are yaw and roll matrices, as conventionally defined. The model, M, may also include parameters corresponding to a translation of the eye and a torsion of the eye.

Similarly, M may include a function of polar coordinates, with a function of the form $R(\theta,\phi)$. If the origin of the polar coordinate system is defined as the point about which the eye rotates, then the model of the surface of the eye may be given by $R(\theta-\alpha, \phi-\beta)$.

In some embodiments, M is an image generating function rather than a mathematical model of a 3D surface. The model of the eye, M, can be an image generating function, $I_M(\alpha, \beta)$, which returns a 2D image for each value of $\alpha$ and $\beta$. $I_M(\alpha, \beta)$ may also include additional inputs such as translation vector and a roll angle ($\gamma$), such that some combination of $\alpha$, $\beta$, $\gamma$, and $[x_0, y_0, z_0]^T$ is mapped to an image. The image generating function, $I_M(\alpha,\beta)$, may select an image from a finite set of images stored in the model store 460. Alternately, $I_M(\alpha, \beta)$ may be a continuous function (i.e., approximately continuous, since it is being implemented via an integer, floating point, or alternate computer-implemented numeral scheme).

In some embodiments, M consists of a set of images, where each image is mapped to a value of $\alpha$ and $\beta$. In alternate embodiments, if the image generating function $I_M(\alpha, \beta)$ does not have an image for the exact values of $\alpha$ and $\beta$, then images that correspond to orientations close to $\alpha$ and $\beta$ can be interpolated together to create a composite image, which is returned by $I_M(\alpha, \beta)$.

In some embodiments, rather than a generic surface, the model, M, consists of a number of parameters which approximately specify the shape of the eye. For example, these parameters could correspond to an average radius of the eye, an average radius of the sclera of the eye, a set of three parameters to approximate the shape of the sclera as a ellipsoid, a radius of the cornea of the eye, a measurement of the protrusion of the cornea from the sclera, a set of parameters specifying the shape of the cornea, and a point of rotation for the eye. Additional parameters may be used to account for deviations from the ideal model specified by the parameters. For example, a bulge on the eye's surface caused by a blood vessel may be accounted for in M via these additional parameters.

The controller 320 generates or trains the model M prior to eye tracking during a calibration sequence. The calibration sequence implemented by the controller 320 may involve using the event camera 350 to repeatedly image the eye. In one embodiment, the user is instructed to look at a certain virtual object or visual indicator that is displayed on an electronic display of a HMD. A portion of the eye can be imaged while the user is looking at the visual indicator. In this way, the eye tracking system 300 can capture sample images of the eye at known orientations of the eye. These sample images can be interpolated into a model, M, which is stored in the model store 460. Once the controller 320 has produced M, eye tracking may begin. In general, eye tracking with a model, M, trained for a specific user's eye is more accurate than eye tracking without such a model. In some embodiments, the controller 320 continues to update M during tracking.

The multiple images of the eye collected during the calibration sequence may be composited into a 3D model, a 3D model generating function, or an image generating function $I_M(\alpha, \beta)$. The 3D model or 3D model generating function may be calculated by converting the set of images captured by the event camera 350 during calibration into a set of 3D surfaces, $\{S_1, \ldots, S_N\}$, which corresponds to a set of yaw values $\{\alpha_1, \ldots, \alpha_N\}$, and pitch values $\{\beta_1, \ldots \beta_N\}$, where $\{\alpha_1, \alpha_N\}$ and $\{\beta_1, \ldots \beta_N\}$ correspond to the position of the visual object displayed on the display. $\{S_1, \ldots, S_N\}$, $\{\alpha_1, \ldots, \alpha_N\}$, and $\{\beta_1 \ldots \beta_N\}$ may be interpolated into a single 3D surface model generating function. In some embodiments, a set of error parameters $\{E_1, \ldots, E_N\}$ is also used to generate M. Each $E_i$ may be a function indicative of the reliability of each point on the surface at $S_i$. Alternately, $E_i$ may be a single value indicative of the reliability of $S_i$ as a whole. $E_i$ can be used to weigh $S_i$ so that the degree to which $S_i$ effects the model is based on $E_i$.

Figure 4:
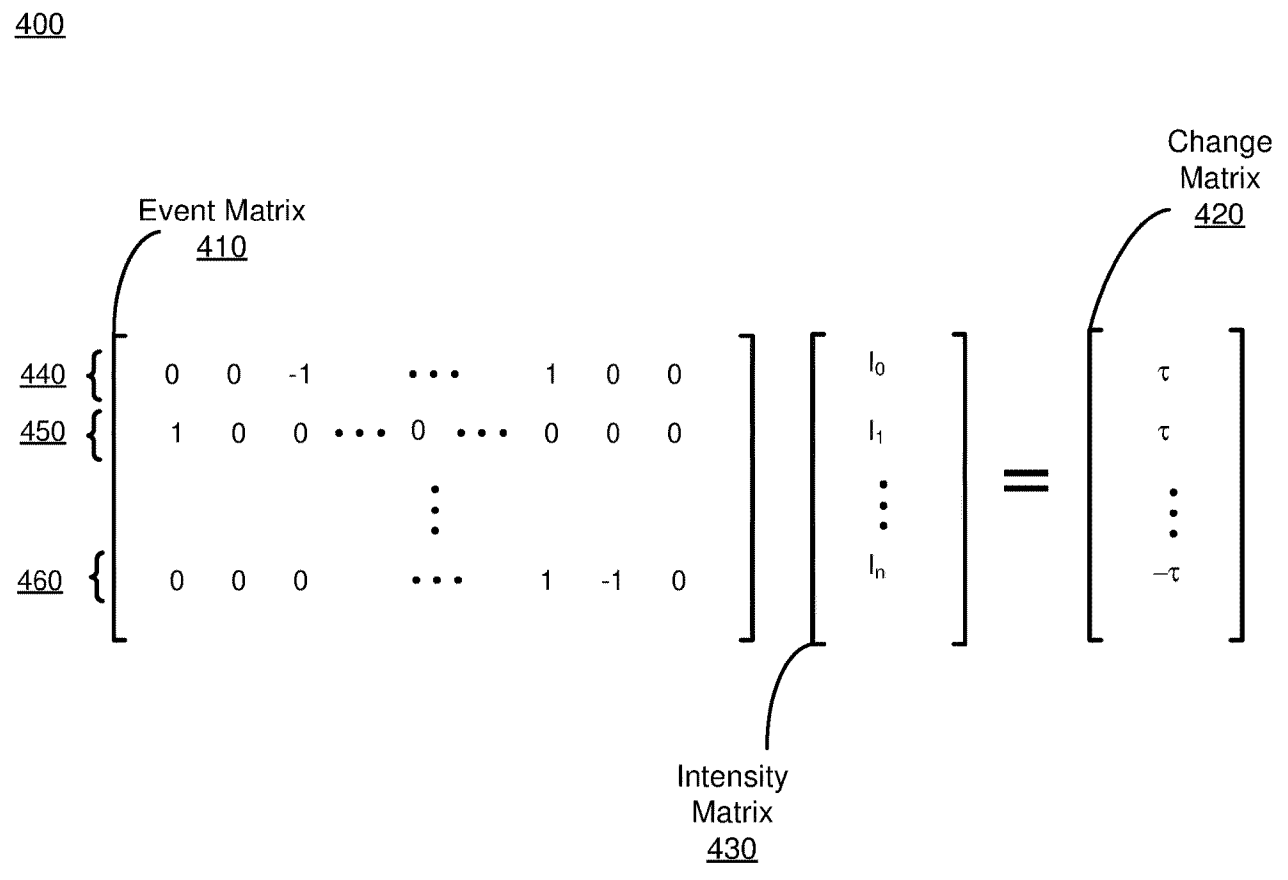

FIG. 4 is an example of an image equation 400 that is populated over a first time period, according to an embodiment. The image equation 400 includes an event matrix 410, a change matrix 420, and an intensity matrix 430.

The event matrix 410 describes AEs that have occurred over the first time period. Each row in the event matrix 410 corresponds to data collected from an AE for a single pixel. Each column in the event matrix 410 corresponds to a specific location in the location area being imaged by the event camera. A value of '0' indicates that no AE occurred at a specific location, and a value of '1' or '−1' indicates that an AE did occur. Specifically, a value of '−1' is inserted at a location of the image at which the associated photodiode detected an AE during the previous time period, and a value of '1' is inserted at the location of an image at which the associated photodiode detected an AE during the current time period. Accordingly, the event matrix 410 is a sparse matrix, where each row has at most two non-zero values, and those values are either 1 or −1. Note that AEs occur asynchronously, accordingly, row 440 may be associated with an AE that occurred at 1 ms, row 450 may be associated with an AE that occurred at 1.1 ms, and row 450 may be associated with an AE that occurred at 10.07 ms.

For each AE occurrence, a new row is added to the change matrix 420. A value input into the new row of the change matrix 420 is either −τ or +τ, where τ is the photodiode value that is output by the photodiode as part of the AE. The value of τ is determined by the settings of the controller 320. In one embodiment, the controller 320 may specify a single value of τ throughout the entire operation of the event camera. In an alternative embodiment, the value of τ specified by the controller 320 may change depending on observations from the event sensor 360. In some embodiments, the settings of the controller 320, and thus the value of τ, may be set based on input from a user of the event camera and/or a console. In other embodiments, the controller 320 may automatically generate values of τ.

With the event matrix 410 and the change matrix 420 populated, the equation 400 can be solved for the intensity matrix 430. The intensity matrix 430 represents data describing the magnitude and direction (e.g. negative or positive) of AE at all pixels within a generated image. The intensity matrix 430 is a matrix representing intensity values of the pixels in an image. Each value of the intensity matrix 430 is unknown, however, they may be solved for as the values of the event matrix 410 and the change matrix 420 are known. Moreover, as the event matrix 410 is a sparse matrix, the values of the intensity matrix 430 may be solved for rapidly (e.g. using Second Order Cone programs).

In some embodiments, the data output from intensity matrix 430 is used in image generation. In an alternative embodiments, the data may be subject to additional constraints prior to its use in image generation. In a further embodiment, the generated image may be edited for errors or gaps in data using data from pre-existing model distributions. Such editing may be utilized to prevent unnatural events from being displayed or to ensure generation of natural-appearing images. One example in which such editing may be used is imaging of a static object such as a smooth table. In this case, the event mode of operation may have a number of AEs below some threshold number associated with adequate visibility of the object in the final image. In these cases, use of data from one or more images taken in conventional mode of operation may be used to e.g., visualize objects that are static relative to the event camera.

Note that generation of images based on changes in relative intensity facilitates sparse population of the event matrix 410. This low volume throughput of data improves the efficiency of image generation compared to the traditional frame capture mode of operation. Moreover, operation of the event camera in the event mode of operation also may utilize less power, memory, and time to generate an image.

Finally, as described above, the controller 320 determines eye tracking information using image data generated by the event camera 350. The controller 320 may also use a model of an eye for estimating orientations of the user's eye.

Figure 5:
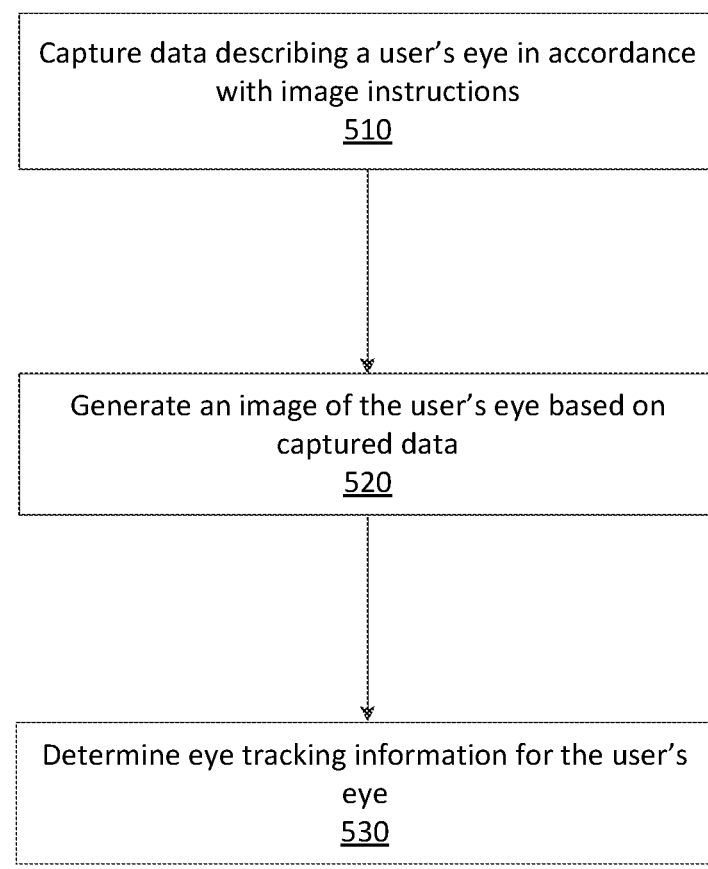
FIG. 5 is a flow chart illustrating a process for generating an image using an event camera, in accordance with one embodiment.

FIG. 5 is a flow chart illustrating a process 500 for determining eye tracking information using an eye tracking system, in accordance with one embodiment. The process 500 may be performed by an eye tracking system (e.g., the eye tracking system 300). In some embodiments, other entities may perform some or all of the steps of the process in other embodiments. Likewise, embodiments may include different and/or additional steps, or perform the steps in different orders.

An eye tracking system captures 510 (e.g., via an event camera) data describing a user's eye in accordance with image instructions. The eye tracking system determines a mode of operation from image instructions, and collects data in accordance with the determined mode of operation. For example, in a conventional mode of operation data values from each photodiode in an event sensor of the event camera are output for a particular time interval. In other embodiments, where the determined mode of operation is an event mode, AEs may be output from the event sensor.

The eye tracking system generates 520 an image of the user's eye based on the captured data. For example, the event camera, in a conventional mode of operation, the event camera forms an image frame using photodiode values read out from the entire event sensor. In contrast, in event mode, the event camera generates an image using the AEs output from the event sensor. The event mode of operation is described in detail with regard to FIGS. 3 and 6.

The eye tracking system determines 530 eye tracking information for the user's eye based on the generated image of the eye. This may be done using a model, M, of the user's eye. The eye tracking system updates a model, M, of the eye based on generated image. The eye tracking system then determines from the model eye tracking information (e.g., an estimated orientation) using the updated model M.

Figure 6:
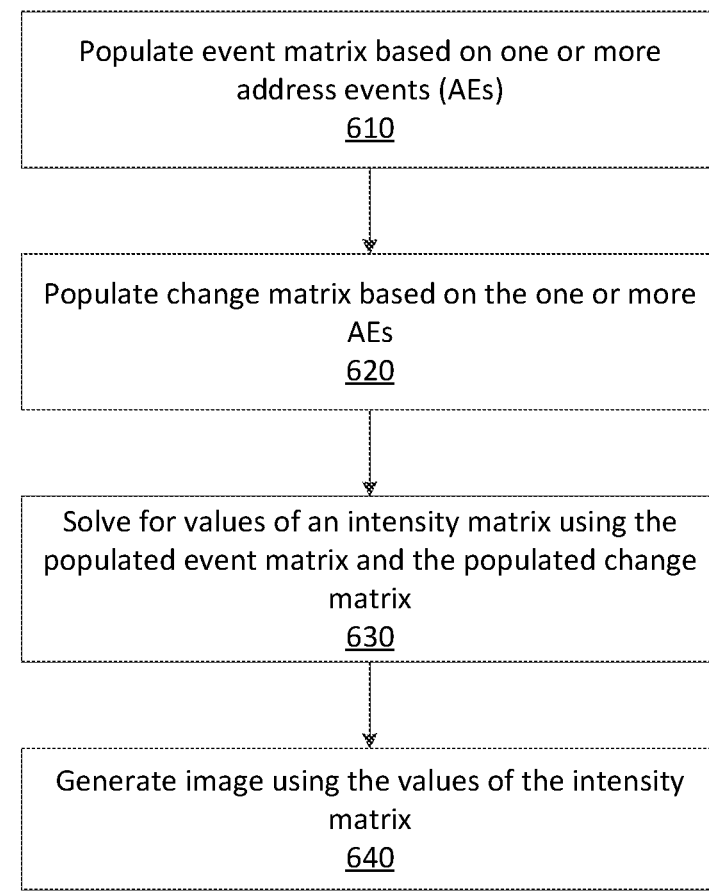
FIG. 6 is a flow chart illustrating a process for generating an image using a camera operating in an event driven mode of operation, in accordance with one embodiment.

FIG. 6 is a flow chart illustrating a process 600 for generating an image using an event camera operating in an event driven mode of operation, in accordance with one embodiment. The process 600 may be performed by an event camera (e.g., the event camera 350). In some embodiments, other entities may perform some or all of the steps of the process 600 in other embodiments. Likewise, embodiments may include different and/or additional steps, or perform the steps in different orders.

The event camera populates 610 an event matrix (e.g., the event matrix 410) based on one or more AEs. As noted above with regard to FIG. 4, the event camera populates the event matrix as AEs occur. Each time an AE is detected, a new row is added to the event matrix. A value of '0' indicates that no AE occurred at a specific location, and a value of '1' or '−1' indicates that an AE did occur. Specifically, a value of '−1' is inserted at a location of the image at which the associated photodiode detected an AE during the previous time period, and a value of '1' is inserted at the location of an image at which the associated photodiode detected an AE during the current time period. Accordingly, the event matrix is a sparse matrix, where each row has at most two non-zero values, and those values are either 1 or −1.

The event camera populates 620 a change matrix (e.g., the change matrix 420) based on the one or more AEs. The change matrix is part of the image equation (1) discussed above. The event camera populates the change matrix as AEs occur. Specifically, for each AE occurrence, a new row is added to the change matrix. A value input into the new row of the change matrix is either $-\tau$ or $+\tau$, where $\tau$ is the photodiode value that is output by the photodiode as part of the AE. As explained above, the value of $\tau$ is determined by the settings of the controller. In one embodiment, the controller may specify a single value of $\tau$ throughout the entire operation of the event camera. In an alternative embodiment, the value of $\tau$ specified by the controller may change depending on observations from the event sensor.

The event camera solves 630 for values of an intensity matrix (e.g., the intensity matrix 430) using the populated event matrix and the populated change matrix. The intensity matrix represents data describing the magnitude and direction (e.g. negative or positive) of AE at all pixels within a generated image. The intensity matrix is a matrix representing intensity values of the pixels in an image. Each value of the intensity matrix is unknown, however, they may be solved for as the values of the event matrix and the change matrix are known. Moreover, as the event matrix is a sparse matrix, the values of the intensity matrix may be solved for rapidly (e.g. using Second Order Cone programs).

The event camera generates 640 an image using the values of the intensity matrix. In some embodiments, the event camera generates the image using portions of one or more image frames captured by the event camera (e.g., while operating in a conventional mode). For example, the event camera may first operate in a conventional mode of operation and take one or more image frames, and then operate in an event mode of operations. The camera can then use the one or more image frames in image generation using the solved intensity values. In another embodiment, the generation of the image may be subject to constraints established by an image captured in the conventional mode of operation of the event camera. In a further embodiment, the generated image may be edited for errors or gaps in data using data from pre-existing model distributions. Such editing may be utilized to prevent unnatural events from being displayed or to ensure generation of natural-appearing images.

Figure 7:
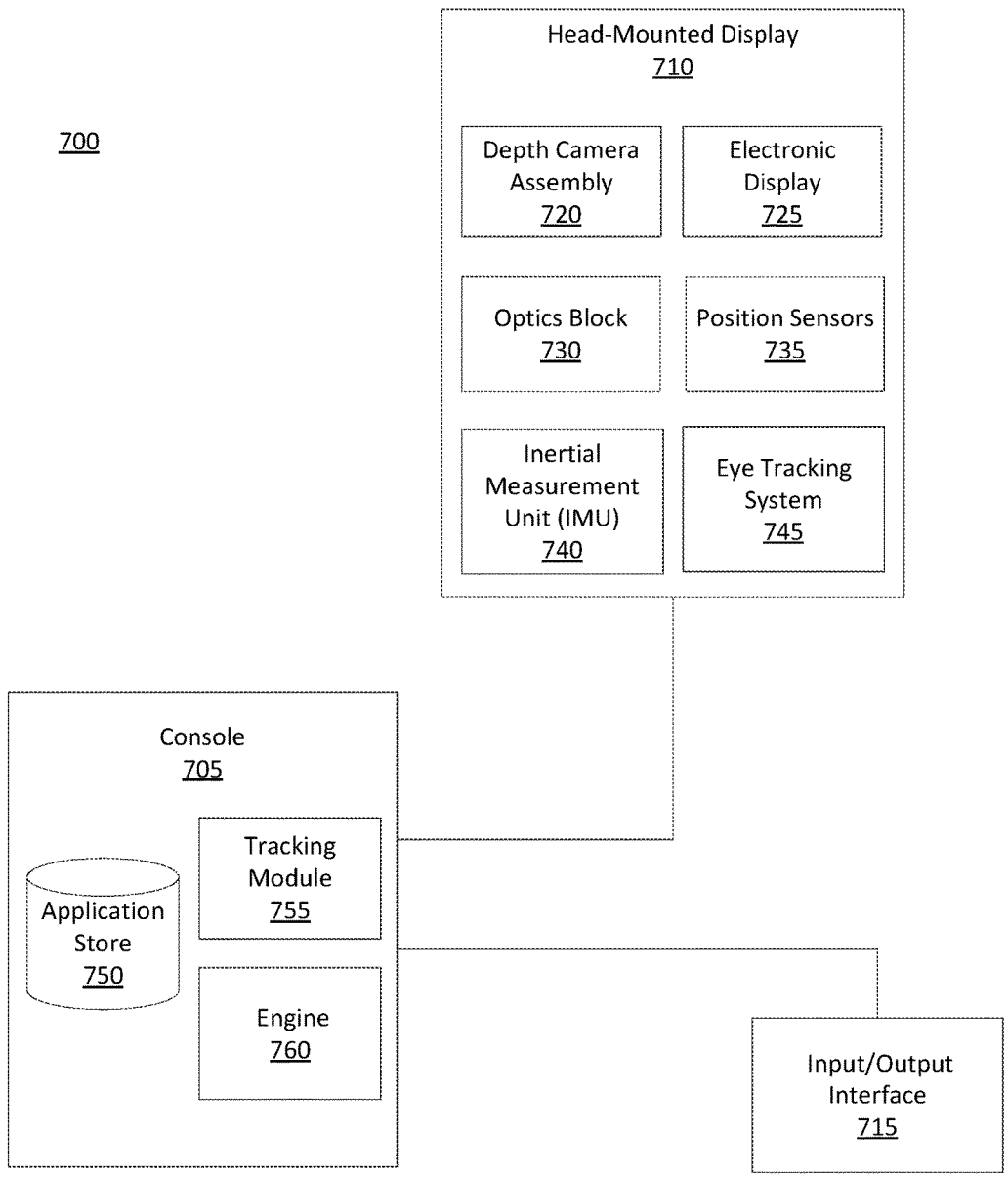
FIG. 7 is a block diagram of a HMD system environment, in accordance with an embodiment.

Turning now to a possible implementation of an eye tracking system, FIG. 7 is a block diagram of a HMD system environment 700 in which a HMD console 705 operates. The HMD system 700 may operate in a VR system environment, an AR system environment, a MR system environment, or some combination thereof. The system environment 700 shown by FIG. 7 includes a HMD 710 and an input/output (I/O) interface 715 that are each coupled to the HMD console 705. While FIG. 7 shows an example system 700 including one HMD 710 and one I/O interface 715, in other embodiments any number of these components may be included in the system 700. For example, there may be multiple HMDs 710, each having an associated I/O interface 715, and communicating with the HMD console 705. In alternative configurations, different and/or additional components may be included in the system environment 700. Similarly, functionality of one or more of the components can be distributed among the components in a different manner than is described here. For example, some or all of the functionality of the HMD console 705 may be contained within the HMD 710.

The HMD 710 is a head-mounted display that presents content to a user comprising virtual and/or augmented views of a physical, real-world environment with computer-generated elements (e.g., two-dimensional (2D) or 3D images, 2D or 3D video, sound, etc.). In some embodiments, the presented content includes audio that is presented via an external device (e.g., speakers and/or headphones) that receives audio information from the HMD 710, the console 705, or both, and presents audio data based on the audio information. The HMD 710 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. Some embodiments of the HMD 710 are further described below in conjunction with FIG. 7.

The HMD 710 includes a DCA 720, an electronic display 725, an optics block 730, one or more position sensors 735, and an inertial measurement unit (IMU) 740. Some embodiments of the HMD 710 have different components than those described here. Similarly, the functions can be distributed among other components in the HMD system 700 in a different manner than is described here.

The DCA 720 captures data describing depth information of an area surrounding the HMD 710. The data describing depth information may be associated with one or a combination of the following techniques used to determine depth information: structured light, time of flight, or some combination thereof. The DCA 720 can compute the depth information using the data, or the DCA 720 can send this information to another device such as the console 705 that can determine the depth information using data from the DCA 720.

The DCA 720 includes an illumination source, an imaging device, and a controller. The illumination source emits light onto an area surrounding the HMD 710. In some embodiments, the emitted light is structured light, which may be in the Infrared. The illumination source includes a plurality of emitters on a single substrate. In some embodiments, the imaging device is an event camera (e.g., the event camera 350). The imaging device captures ambient light and light from one or more emitters of the plurality of emitters of the plurality of emitters that is reflected from objects in the area. The controller coordinates how the illumination source emits light and how the imaging device captures light. In some embodiments, the controller may also determine depth information associated with the local area using the captured images.

The illumination source of the DCA 720 includes a one or more emitters that emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic light emitting diodes (LEDs), a vertical-cavity surface-emitting laser (VCSEL), or some other source. In some embodiments, a single emitter or a plurality of emitters in the illumination source can emit light having a structured light pattern.

The electronic display 725 displays 2D or 3D images to the user in accordance with data received from the console 705. In various embodiments, the electronic display 725 comprises a single electronic display or multiple electronic displays (e.g., a display for each eye of a user). Examples of the electronic display 725 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 725 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display 725.

The optics block 730 magnifies received light from the electronic display 725, corrects optical errors associated with the image light, and the corrected image light is presented to a user of the HMD 710. The optics block 730 is an optical element, such as an aperture, a Fresnel lens, a convex lens, a concave lens, a filter, or any other suitable optical element that affects the image light emitted from the electronic display 725. Moreover, the optics block 730 may include combinations of different optical elements. In some embodiments, one or more of the optical elements in the optics block 730 may have one or more coatings, such as partial reflectors or anti-reflective coatings.

Magnification of the image light by the optics block 730 allows the electronic display 725 to be physically smaller, weigh less, and consume less power than larger displays. Additionally, magnification may increase a field of view of the displayed media. For example, the field of view of the displayed media is such that the displayed media is presented using almost all (e.g., 110° diagonal), and in some cases all, of the user's instantaneous field of view. In some embodiments, the effective focal length the optics block 730 is larger than the spacing to the electronic display 725. Consequently, the optics block 730 magnifies the image light projected by the electronic display 725. Additionally, in some embodiments, the amount of magnification may be adjusted by adding or removing optical elements.

The optics block 730 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 725 for display is pre-distorted, and the optics block 730 corrects the distortion when it receives image light from the electronic display 725 generated based on the content.

The IMU 740 is an electronic device that generates fast calibration data based on measurement signals received from one or more of the position sensors 735. A position sensor 735 generates one or more measurement signals in response to motion of the HMD 710. Examples of position sensors 735 include: one or more accelerometers, one or more gyroscopes, one or more magnetometers, another suitable type of sensor that detects motion, a type of sensor used for error correction of the IMU 740, or some combination thereof. The position sensors 735 may be located external to the IMU 740, internal to the IMU 740, or some combination thereof.

Based on the one or more measurement signals from one or more position sensors 735, the IMU 740 generates fast calibration data indicating an estimated position of the HMD 710 relative to an initial position of the HMD 710. For example, the position sensors 735 include multiple accelerometers to measure translational motion (forward/back, up/down, left/right) and multiple gyroscopes to measure rotational motion (e.g., pitch, yaw, roll). In some embodiments, the IMU 740 rapidly samples the measurement signals and calculates the estimated position of the HMD 710 from the sampled data. For example, the IMU 740 integrates the measurement signals received from the accelerometers over time to estimate a velocity vector and integrates the velocity vector over time to determine an estimated position of a reference point on the HMD 710. Alternatively, the IMU 740 provides the sampled measurement signals to the HMD console 705, which determines the fast calibration data. The reference point is a point that may be used to describe the position of the HMD 710. While the reference point may generally be defined as a point in space; however, in practice the reference point is defined as a point within the HMD 710 (e.g., a center of the IMU 740).

The IMU 740 receives one or more calibration parameters from the console 705. As further discussed below, the one or more calibration parameters are used to maintain tracking of the HMD 710. Based on a received calibration parameter, the IMU 740 may adjust one or more IMU parameters (e.g., sample rate). In some embodiments, certain calibration parameters cause the IMU 740 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The HMD 710 also includes an eye tracking system 745. The eye tracking system 745 includes an event camera configured to capture images of one or both eyes of the user. The eye tracking system 745 generates eye tracking information (e.g., gaze angle) using the captured images. In some embodiments, the eye tracking system 745 is the eye tracking system 300 depicted in FIG. 3.

The I/O interface 715 is a device that allows a user to send action requests to the HMD console 705. An action request is a request to perform a particular action. For example, an action request may be to start or end an application or to perform a particular action within the application. The I/O interface 715 may include one or more input devices. Example input devices include: a keyboard, a mouse, a game controller, or any other suitable device for receiving action requests and communicating the received action requests to the HMD console 705. An action request received by the I/O interface 715 is communicated to the HMD console 705, which performs an action corresponding to the action request. In some embodiments, the I/O interface 715 may provide haptic feedback to the user in accordance with instructions received from the HMD console 705. For example, haptic feedback is provided when an action request is received, or the HMD console 705 communicates instructions to the I/O interface 715 causing the I/O interface 715 to generate haptic feedback when the HMD console 705 performs an action.

The console 705 provides media to the HMD 710 for presentation to the user in accordance with information received from one or more of: the eye tracking system 745, the HMD 710, and the I/O interface 715. In the example shown in FIG. 7, the HMD console 705 includes an application store 750, a tracking module 755, and an engine 760. Some embodiments of the HMD console 705 have different modules than those described in conjunction with FIG. 7. Similarly, the functions further described below may be distributed among components of the HMD console 705 in a different manner than is described here.

The application store 750 stores one or more applications for execution by the HMD console 705. An application is a group of instructions, that when executed by a processor, generates content for presentation to the user. Content generated by an application may be in response to inputs received from the user via movement of the HMD 710 or the I/O interface 715. Examples of applications include: gaming applications, conferencing applications, video playback application, or other suitable applications.

The tracking module 755 calibrates the HMD system 700 using one or more calibration parameters and may adjust one or more calibration parameters to reduce error in determination of the position of the HMD 710. Moreover, calibration performed by the tracking module 755 also accounts for information received from the IMU 740. Additionally, if tracking of the HMD 710 is lost, the tracking module 755 re-calibrates some or all of the system environment 700.

The tracking module 755 tracks movements of the HMD 710 using fast calibration information from the HMD 710 and/or depth information from the HMD 710. The tracking module 755 determines positions of a reference point of the HMD 710 using position information from the fast calibration information and/or the depth information. Additionally, in some embodiments, the tracking module 755 may use portions of the fast calibration information, depth information, or some combination thereof, to predict a future location of the HMD 710. The tracking module 755 provides the estimated or predicted future position of the HMD 710 to the Engine 760.

The engine 760 executes applications within the system environment 100 and receives position information, acceleration information, velocity information, predicted future positions, or some combination thereof of the HMD 710 from the tracking module 755. Based on the received information, the engine 760 determines content to provide to the HMD 710 for presentation to the user. For example, if the received information indicates that the user has looked to the left, the engine 760 generates content for the HMD 710 that mirrors the user's movement in a virtual environment. Additionally, the engine 760 performs an action within an application executing on the HMD console 705 in response to an action request received from the I/O interface 715 and provides feedback to the user that the action was performed. The provided feedback may be visual or audible feedback via the HMD 710 or haptic feedback via the I/O interface 715.

The engine 760 may be also configured to adjust resolution of the images displayed on the electronic display 725 by performing foveated rendering of the displayed images, based at least in part on the determined eye tracking information obtained from the eye tracking system 745. In this case, the engine 760 provides appropriate image signals to the electronic display 725. The engine 760 provides image signals having a target resolution to the electronic display 725 for a portion of the electronic display 725 that corresponds to a foveal region of the user's eye-gaze, while providing image signals with lower resolution in other regions of the electronic display 725. In some embodiments, the target resolution is a resolution corresponding to a fovea region of a human eye.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An eye tracking system comprising:
an event camera configured to image an eye of a user, the event camera comprising:
an event sensor comprising a plurality of photodiodes, the event sensor configured to operate in a mode of a plurality of modes, the plurality of modes including an event mode that causes the plurality of photodiodes to asynchronously output data values, wherein a data value output by each respective photodiode, of the plurality of photodiodes, is based at least in part on a difference of a value previously output by the photodiode and an intensity value captured by the photodiode relative to a threshold intensity value; and
a camera controller configured to:
populate an event matrix based in part on data values asynchronously received from the event sensor and positions of photodiodes of the plurality of photodiodes associated with the received data values over a first time period,
populate a change matrix based in part on the threshold intensity value and the photodiodes associated with the received data values over the first time period, and
generate an image of the eye for the first time period using the event matrix and the change matrix; and
a controller configured to determine eye tracking information using the generated image.

2. The eye tracking system of claim 1, wherein the eye tracking system is part of a head-mounted display (HMD).

3. The eye tracking system of claim 2, wherein the HMD includes an electronic display, and the HMD is configured to display content on a first portion of the electronic display at a target resolution, the first portion corresponding to a foveal region of the user's eye-gaze, and display content on other portions of the electronic display at a resolution that is less than the target resolution.

4. The eye tracking system of claim 3, wherein the target resolution corresponds to a foveal resolution of a human eye.

5. The eye tracking system of claim 1, wherein the plurality of modes includes a conventional mode causes the plurality of photodiodes to each output an intensity value that is used to generate an image frame.

6. The eye tracking system of claim 5, wherein the controller is further configured to:
generate imaging instructions that determine the mode the event sensor operates in, wherein the imaging instructions cause the event sensor to operate in the conventional mode for a first time period, and then operate in the event mode for a second time period that is subsequent to the first time period; and
provide the imaging instructions to the event sensor.

7. The eye tracking system of claim 1, wherein each photodiode of the photodiodes is configured to output a data value after an absolute value of the difference between the data value and a value previously output by the each photodiode is greater than the threshold intensity value.

8. The eye tracking system of claim 7, wherein the threshold intensity value is based on a statistical distribution of expected threshold intensities.

9. The eye tracking system of claim 1, wherein the threshold intensity value is determined by the controller.

10. The eye tracking system of claim 1, wherein populating an event matrix based in part on data values asynchronously received from the event sensor and the positions of the photodiodes associated with the received data values over a first time period, comprises:
for each of the received data values that indicate than an address event (AE) occurred over the first time period, adding a new row to the event matrix;
inserting a value of '0' at locations within the new row of the event matrix that are associated with the positions of the photodiodes that are associated with received data values that indicate no AE occurred over the first time period;
inserting a value at locations within the new row of the event matrix that are associated with the positions of the photodiodes that are associated with the received data values that indicate that an AE occurred over a time period prior to the first time period; and
inserting a different value at locations within the new row of the event matrix that are associated with the positions of the photodiodes that are associated with received data values that indicate than an AE occurred over the first time period.

11. The eye tracking system of claim 1, wherein the populating a change matrix based in part on the threshold intensity value and the photodiodes associated with the received data values over the first time period, comprises:
for each of the received data values that indicate that an address event (AE) occurred over the first time period, adding a new row to the change matrix; and
inserting a value that is a multiple of one of the received data values that indicates that the AE occurred in one or more positions in the new row.

12. The eye tracking system of claim 1, wherein the controller is configured to generate the image for the first time period using the event matrix and the change matrix, based in part on solving for an intensity matrix using the equation:

$$Ax=y$$

where A is the event matrix,
y is the change matrix, and
x is the intensity matrix.

13. An eye tracking system comprising:
an event camera configured to image an eye of a user, the event camera comprising:
an event sensor comprising a plurality of photodiodes, the event sensor configured to operate in a mode of a plurality of modes, the plurality of modes including an event mode that causes the plurality of photodiodes to asynchronously output data values, wherein a data value output by each respective photodiode, of the plurality photodiodes, is based at least in part on a difference of a value previously output by the photodiode and an intensity value captured by the photodiode relative to a threshold intensity value;
an optical assembly configured to direct light from a local area in a field of view of the eye tracking system to the event sensor; and a camera controller configured to:
populate an event matrix based in part on data values asynchronously received from the event sensor and positions of photodiodes of the plurality of photodiodes associated with the received data values over a first time period,
populate a change matrix based in part on the threshold intensity value and the photodiodes associated with the received data values over the first time period, and
generate an image of the eye for the first time period using the event matrix and the change matrix; and
a controller configured to determine eye tracking information using the generated image.

14. The eye tracking system of claim 13, wherein the eye tracking system is part of a head-mounted display (HMD).

15. The eye tracking system of claim 14, wherein the HMD includes an electronic display, and the HMD is configured to display content on a first portion of the electronic display at a target resolution, the first portion corresponding to a foveal region of the user's eye-gaze, and display content on other portions of the electronic display at a resolution that is less than the target resolution.

16. The eye tracking system of claim 15, wherein the target resolution corresponds to a foveal resolution of a human eye.

17. The eye tracking system of claim 13, wherein each photodiode of the photodiodes is configured to output a data value after an absolute value of the difference between the data value and a value previously output by the each photodiode is greater than the threshold intensity value.

18. The eye tracking system of claim 17, wherein the threshold intensity value is based on a statistical distribution of expected threshold intensities.

19. The eye tracking system of claim 13, wherein the controller is configured to generate the image for the first time period using the event matrix and the change matrix, based in part on solving for an intensity matrix using the equation:

$$Ax=y$$

where A is the event matrix,
y is the change matrix, and
x is the intensity matrix.

20. A non-transitory computer-readable storage medium storing executable computer program instructions, the instructions executable to perform steps comprising:
populating an event matrix based in part on:
data values asynchronously received from an event sensor comprising a plurality of photodiodes, the event sensor configured to operate in a mode of a plurality of modes, the plurality of modes including an event mode that causes the plurality of photodiodes to asynchronously output data values, wherein a data value output by each respective photodiode, of the plurality of photodiodes, is based at least in part on a difference of a value previously output by the photodiode and an intensity value captured by the photodiode relative to a threshold intensity value, and
positions of photodiodes of the plurality of photodiodes associated with the received data values over a first time period;
populating a change matrix based in part on the threshold intensity value and the photodiodes associated with the received data values over the first time period;
generating an image of an eye of a user for the first time period using the event matrix and the change matrix; and
determining eye tracking information using the generated image.

* * * * *